May 12, 1964 J. M. STRANG ETAL 3,133,143

PERISCOPES WITH COMPENSATION FOR IMAGE MOTION CAUSED BY BENDING

Filed Oct. 23, 1956 4 Sheets-Sheet 1

Inventors
JOHN MARTIN STRANG and
DAVID SCARTH RITCHIE
By
Mason, Fenwick & Lawrence
Attorneys Inventors
JOHN MARTIN STRANG and
DAVID SCARTH RITCHIE
By
Mason, Fenwick & Lawrence
Attorneys

PERISCOPES WITH COMPENSATION FOR IMAGE MOTION CAUSED BY BENDING

Filed Oct. 23, 1956

Inventors
JOHN MARTIN STRANG and
DAVID SCARTH RITCHIE
By
Mason, Fenwick & Lawrence
Attorneys

PERISCOPES WITH COMPENSATION FOR IMAGE MOTION CAUSED BY BENDING

Filed Oct. 23, 1956

Inventors
JOHN MARTIN STRANG and
DAVID SCARTH RITCHIE
By
Mason, Fenwick & Lawrence
Attorneys United States Patent Office 3,133,143

Patented May 12, 1964

3,133,143

PERISCOPES WITH COMPENSATION FOR IMAGE MOTION CAUSED BY BENDING

John Martin Strang and David S. Ritchie, Anniesland, Glasgow, Scotland, assignors to Barr and Stroud Limited, Glasgow, Scotland, a British company Filed Oct. 23, 1956, Ser. No. 617,881
Claims priority, application Great Britain Nov. 1, 1955
6 Claims. (Cl. 88—72)

This invention relates to optical viewing instruments and more particularly to periscopes.

In some optical viewing instruments such as periscopes for submarine or land use, disturbing movements of the image viewed by the observer are caused by bending of the casing or part of the casing of the instrument. Such bending may be caused by vibration imparted to the instrument, by the vibration of the vessel carrying the instrument, by the passage of the instrument through a surrounding medium such as sea water, or by the action of gravity on the casing if the instrument is tilted out of the vertical.

It is an object of the invention to obviate or mitigate such movements of the image.

According to the invention we provide an optical viewing instrument, for example a periscope, having a telescope system within a casing, which casing is subject to bending, the optical parts of the said telescope system being so mounted within the casing that the movement of one optical part or group of parts, with the bending, compensates the movement of another optical part, or other group of parts, so that the movement, due to the bending of the final image viewed by the eyepiece is substantially eliminated.

Further according to the invention we provide an optical viewing instrument, for example a periscope, including a casing having a telescope system, the casing being subject to bending; said instrument including means for influencing the movement of at least one optical part so that its position relative to the casing is changed when the casing bends away from the normal position, such change acting to obviate or mitigate undesired image movement tending to arise through displacement of at least one other optical part caused by bending of said casing.

In one arrangement a lens of the system is carried on a stiff carrier within the casing, the supports of the carrier being so arranged that the lens does not partake of the full amount of the bending of the casing. Alternatively, the carrier supports may be so arranged that the lens moves by a larger amount than the movement due to the casing bending at its plane. The arrangement of the carrier supports may be such that the movement of the final image caused by said lens due to the bending may be substantially equal and opposite to the movement, due to the bending, of the final image due to the movement of other optical parts, for example the end prism of the instrument, thus effecting compensation.

In another form the supports for the carrier may be provided at one longitudinal position in one axial plane and at a different longitudinal position in the perpendicular axial plane, thus providing a different compensation in the one plane from the other.

In another application of the invention a lens situated within a non-bending part of the casing may be caused to move with the bending by being mounted on a stiff carrier or tube one end of which is supported in the bending part of the casing and the other end in the non-bending part. By this means an additional compensation for the movement of another optical part or parts may be provided.

Alternatively the supports for the stiff carrier may both be situated in the bending portion of the casing, in which case a movement may be imparted, with the bending, to the said lens in the opposite direction to that in the previous paragraph.

In another arrangement movement of the end prism due to bending of the casing may be controlled to a desired amount by relative movement of the said carrier and the prism holder. By this means the movement of the final image due to the movement of the prism may be more easily compensated by the movement of the lens.

In another arrangement the movement of one lens of the system may be used to compensate for the movement of an adjacent lens of the system so as substantially to eliminate the movement of the final image due to the movement of the said two lenses. This may be accomplished by mounting one of the lenses on the said carrier and mounting the other lens on the casing.

In a modification the lenses in the bending portion of a telescope or periscope may be so arranged that they form an image of a distant object in a plane at a short distance from the point of bending of the casing. Further the position of the lenses may be so adjusted that the said distance is such that the movement of the image relative to the bent axis of the telescope in the bending portion is equal and opposite to the movement of the bent axis relative to the original axis at the plane of the image.

In a further modification said casing is carried by a fixed mounting, the telescope comprising a positive lens and a negative lens, the negative lens being positioned further from said fixed mounting than is the positive lens, whereby on bending of said casing away from its normal axis, a ray from the centre of the virtual image of said negative lens reaches said normal axis at the focal plane of the real image of the positive lens, and thus no movement of such image results from said bending.

The carriers may be of any appropriate degree of stiffness or may be rigid. In practice the carrier need not be completely rigid, but while preferably being stiff may be of a degree of flexibility less than that of the outer casing.

We will now describe some embodiments of the invention simply by way of example with reference to the accompanying drawings (the same references in different figures represent similar parts) in which.

Figure 1:
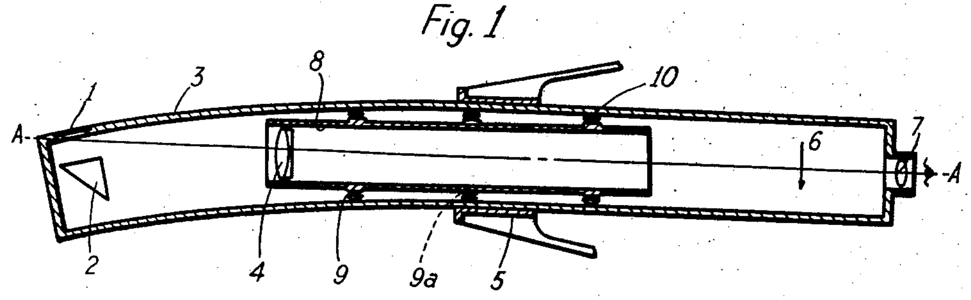
FIG. 1 is a diagrammatic view of a periscope according to the invention in longitudinal mid-section, the casing being shown in a bent position.

Referring to the drawings, FIG. 1 shows a periscope, a portion of which is subject to bending. The casing 3 of the periscope carries a window 1, a prism 2, and an eyepiece 7, the casing being supported in the fixed bearing 5. The portion of the casing on the object side of the bearing is subject to bending, as indicated by the curvature of the casing away from the normal axis A—A, while the remainder of the casing is not subject to bending.

A stiff tubular carrier 8 is supported within the casing by the supports 9 and 10, and the carrier carries an objective lens 4.

Light from a distant object enters the casing through window 1, is reflected along the interior of the casing by the prism 2 and is focussed by the lens 4 on to the focal plane 6 where it is viewed by the eyepiece 7.

It will be seen that with the supports 9 and 10 in the positions indicated in the figure the lens 4 will not move transversely by as much as the casing at the plane of the lens; that is, by placing the supports 9 and 10 as shown, the transverse movement of the lens 4, due to bending, has been reduced. Obviously the transverse movement of the lens 4 can be adjusted by adjusting the position of the supports. If, for instance, the support 9 is moved to position *9a*, the movement of the lens 4 will be reduced to zero. As hereinafter explained, by suitably placing the supports, therefore, it may be possible to provide a compensation of the correct amount to balance the movement of the image produced by the movement of the prism 2, thus eliminating the movement of the final image at 6.

Figure 2:
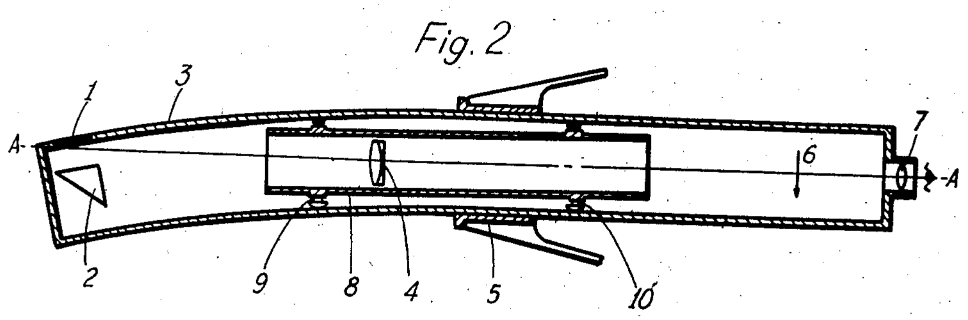
FIG. 2 is a similar view of a modification.

FIG. 2 shows a variation of the arrangement in FIG. 1. In this case the support 9 is between the lens 4 and the distant object, and it will be seen that this gives an increased movement to the lens 4, i.e., in this instance the lens 4 moves more than the casing at the plane of the lens.

Figure 2A:
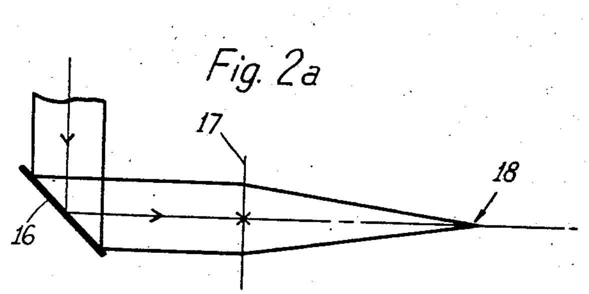
FIGS. 2A and 2B are diagrams illustrating the method of operation.
Figure 2B:
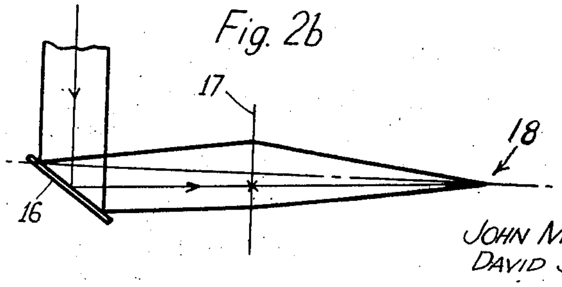

FIGS. 2A and 2B show diagrammatically the method of using the controlled transverse movement of the lens to correct the effect of the prism. In FIG. 2A a parallel beam of light from the distant object is reflected by the mirror 16 in a direction along the axis of the telescope through the lens 17 which is represented by a single line with a cross to indicate the optical centre. The image is formed on the axis of the telescope at 18.

If the telescope to which this system belongs is subject to bending in the direction shown in FIG. 1 or FIG. 2, the mirror 16 and lens 17 will be displaced as shown in FIG. 2B. The mirror 16 will be rotated in a counterclockwise direction and the beam of light from the object will thus be reflected upwards, causing the image to move upwards.

The lens 17 will move transversely downwards, causing the image to move downwards, and if the amount of this movement is such that a ray in the parallel beam passing through the optical centre of the lens is directed towards the point 18, it will be seen that compensation has been effected and movement of the image at 18 has been eliminated.

Figure 3:
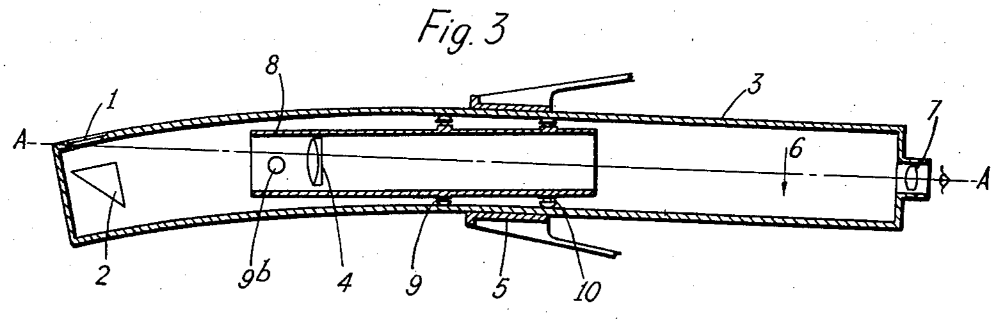
FIGS. 3 to 11 are views similar to FIGS. 1 and 2 but of modifications.
Figure 4:
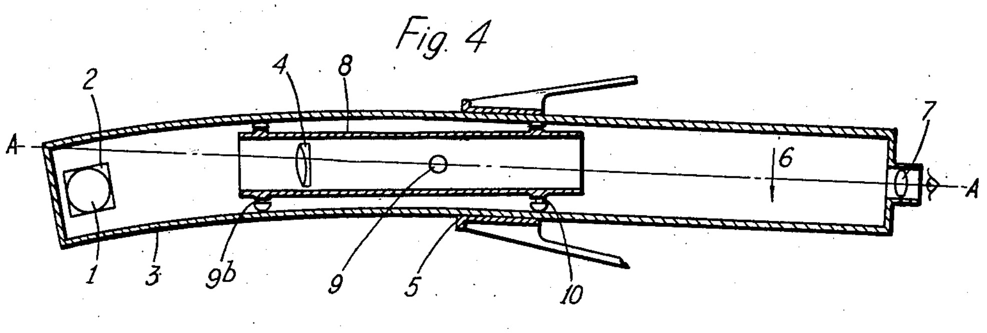

FIGS. 3 and 4 show a further variation of the arrangements in FIGS. 1 and 2. In this instance the support 9 is divided into two portions in axial planes at right angles to each other. In the one plane the supports are shown at 9 at one longitudinal position, while in the plane at right angles the support is shown at *9b* in a different longitudinal position. The movement of the lens 4 with bending in the plane of sight will be controlled by the position of the support 9 as shown in FIG. 3. The movement of the lens 4 with bending in the plane perpendicular to the plane of sight will be controlled by the position of the support *9b* as shown in FIG. 4. Thus different corrections can be obtained in different planes by suitably placing the supports 9 or *9b*.

Figure 5:
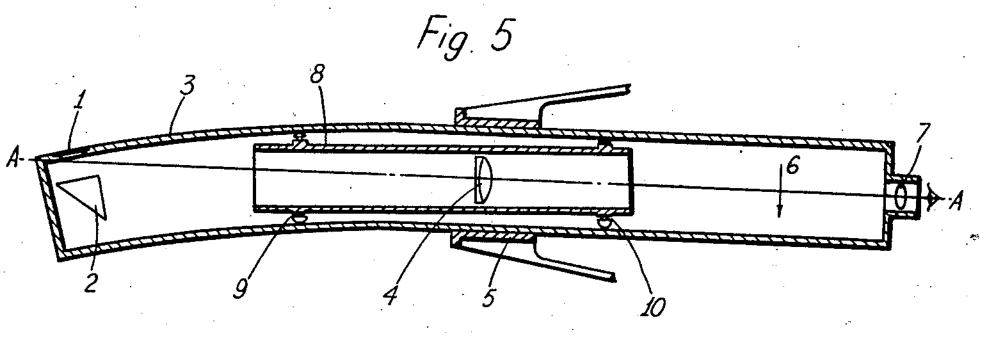
Figure 6:
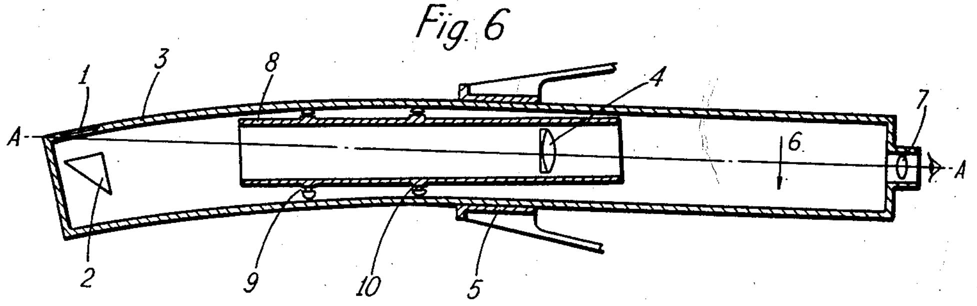

FIGS. 5 and 6 show methods of imparting a compensating movement to a lens situated within the fixed portion of the casing.

In FIG. 5 the stiff carrier 8 which caries the lens 4 is supported by the supports 9 and 10, support 9 being within the bending portion of the casing 3 and support 10 within the fixed portion of the casing. It will be seen that lens 4 then partakes of the movement due to the bending although it is situated within the fixed portion of the casing. With the arrangement as shown in FIG. 5 the lens 4 moves in the same direction as the bending.

In FIG. 6 the supports 9 and 10 are both situated in the bending portion of the casing which results in the lens 4 moving in the opposite direction to the bending. It will be obvious from these two figures that a considerable choice of correction, due to the movement of the lens 4, is available by the placing of supports 9 and 10. It will also be obvious that the corrections shown in FIGS. 5 and 6 apply whether the casing is bent in a curve or in a straight line.

Figure 7:
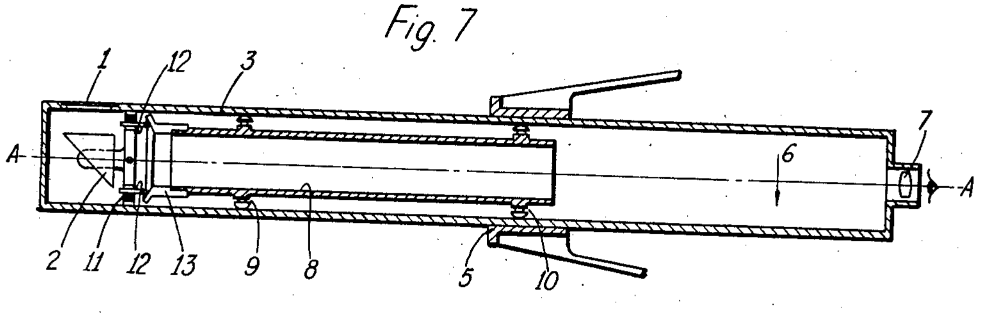

FIG. 7 shows another embodiment in which the stiff carrier 8 is extended to a position adjacent the end prism 2. A disc 13 of saucer-like form, is carried on the end of the carrier 8 a central through aperture being provided in the disc to permit passage of light from the prism. The prism is carried on a plate 11 connected to the casing 3 by means of a pivot perpendicular to the plane of the paper. The plate 11 is provided with feet 12 which bear on the concave surface of the disc 13. The carrier 8 is supported on supports 9 placed at a considerable distance from the end of the carrier and on supports 10. When the casing bends, the plate 11 will move further than the disc 13 thus causing a relative movement between the feet 12 and the disc 13. A tilting movement will then be imparted to the prism, the amount of the tilt being dependent on the curvature of the surface of the disc 13. This curvature may be arcuate or of other form desired, and is so arranged that the net rotation of the prism is adjusted to compensate for the movement of the other optical parts of the periscope.

Figure 8:
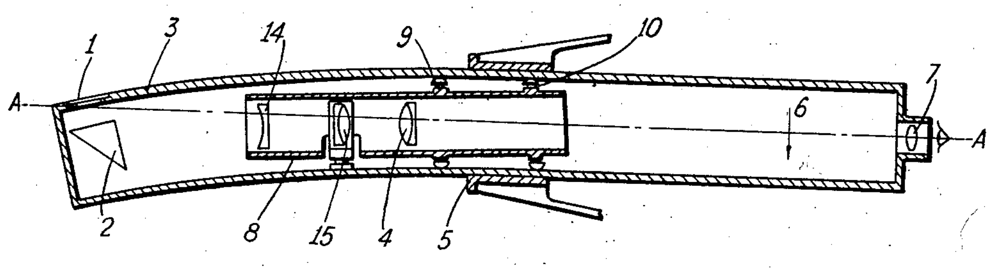

In FIG. 8 there are two additional lenses, 14 and 15, say, for giving a different magnification in the periscope. The lenses 14 and 15 may form an inverted Galilean telescope, the lens 14 being a negative objective and the lens 15 a positive objective so arranged that light entering 14 as a parallel beam will emerge from 15 again as a parallel beam but with reduced magnification.

The lens 14 is carried on the stiff carrier 8 and the lens 15 is carired direct on the outer casing 3. According to the position of the supports 9 and 10, there will be a relative movement, when bending ocurs, between the end of the carrier 8 at which the lens 14 is situated, and the casing 3. As the lens 15 is supported on the casing 3 there will thus be a relative movement of the lens 14 and the lens 15. By suitably placing the supports 9 and 10 of the carrier 8, this relative movement may be adjusted to maintain the line adjoining the optical centres of the lenses 14 and 15 parallel to the original optical axis of the periscope. There will then be no movement, when bending occurs, of the final image due to the movements of the lenses 14 and 15.

Figure 9:
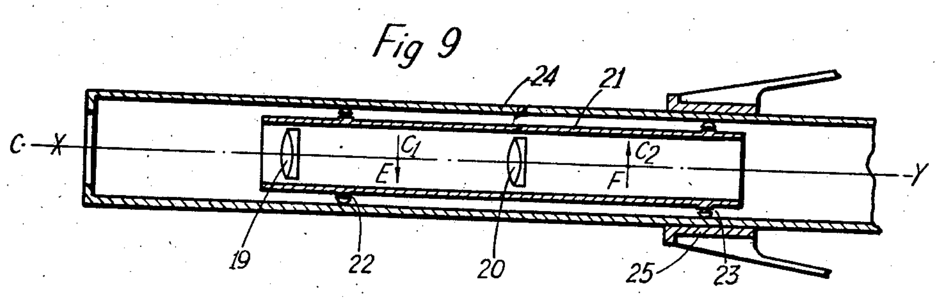

FIG. 9 illustrates in unbent condition the portion of a telescope subject to bending. The telescope views a distant object along the line C in prolongation of its optical axis XY, the casing 24 of the telescope being supported in a housing 25. The portion of the casing to the left of the housing 25 is subject to bending and the portion within the housing and to the right of it is not subject to bending.

Figure 10:
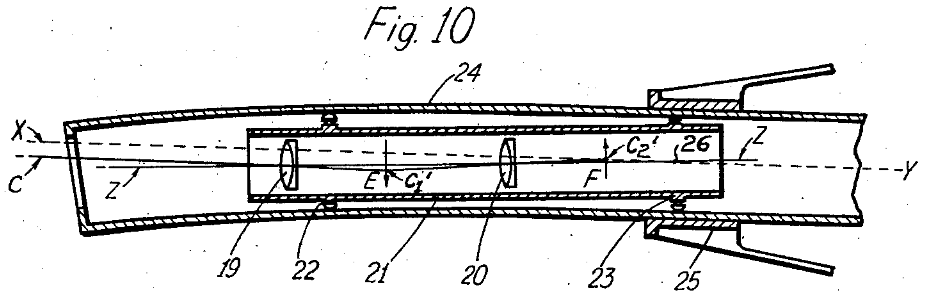

FIG. 10 shows the effect of bending.

Referring to FIG. 9, the lens 19 forms an image of C at $C_1$ in the plane E and on the optical axis of the telescope, and the lens 20 projects the image to $C_2$ in the plane F and on the axis of the telescope. The lenses 19 and 20 are mounted in a rigid tube 21 which is supported in the casing 24 by the supports 22 and 23.

Referring to FIG. 10, it will be seen that, when bending occurs, the tube 21 carrying the lenses 19 and 20 will be tilted relative to the optical axis XY, about a point 26 in the plane of the support 23 and on the axis XY of the telescope, and the optical axis of the partial telescope carried by tube 21 will take up the position ZZ passing through the point 26. The image of C formed by lens 19 in the plane E will no longer be on the axis, but will be displaced to the point $C_1'$. This image will in turn be projected by lens 20 to a point $C_2'$ in the plane F. By suitably placing the lens 20 so that the image plane F is formed at an appropriate distance to the left of the plane through the supports 23, it will be seen that the image $C_2'$ can be arranged to lie on the original optical axis XY of the telescope. This is accomplished when the lenses are so arranged that the image $C_2'$ moves relative to the axis ZZ by an amount equal and opposite to the movement at the image plane F of the axis ZZ relative to the original axis XY. Thus the image $C_2'$ will be in the same place as the image $C_2$ in FIG. 9 and the image of the object of C remains stationary in spite of the bending. Thus the appropriate placing of the lens 20 causes the movement of the image, due to the transverse movements of the lenses, to be eliminated.

Figure 11:
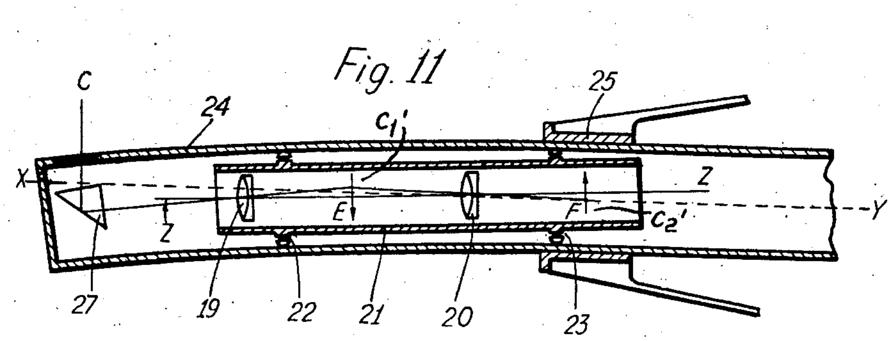

FIG. 11 shows a modification of the previous arrangement shown in FIGS. 9 and 10. In FIG. 11 a right-angled prism 27 is added to give vision at right angles to the axis of the telescope. In this instance, owing to the reversal of the beam of light by reflection in the prism 27 the image of an object C in a direction perpendicular to the optical axis of the instrument, is displaced to $C_1'$ at the plane E, that is, in the opposite direction to the displacement shown in FIG. 10. Similarly the image $C_2'$ in the image plane F is displaced in the opposite direction to that shown in FIG. 10. To correct for the movement in this instance, the lens 20 is so placed that the image plane F is formed at an appropriate distance to the right of the plane through the supports 23. If the distance is suitably chosen, it will be seen that the image $C_2'$ can be formed on the optical axis XY of the instrument and therefore the movement of the image of C is eliminated.

Figure 12:
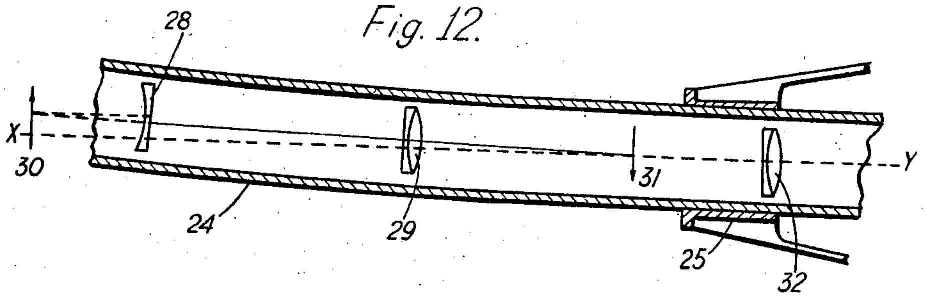
FIG. 12 is a diagrammatic view of a further embodiment of the invention.

In FIG. 12 the telescope contained in tube 24, which is carried in a fixed support 25, views a distant object along the line YX. Tube 24 is shown in a condition bent away from the normal axis YX. The telescope parts shown indicate a negative objective 28, a positive objective 29, and a positive collimating objective 32. When the tube is unbent, the three lenses are situated with their optical centres on the line YX, and light from the distant object, after passing through the three lenses, emerges from lens 32, in a parallel beam towards the remaining part of the telescope not shown on the drawing.

The negative lens 28, forms a virtual image of the distant object at the plane 30. The positive objective 29 projects the image from the plane 30 to the real image in plane 31. If the lens 32 is situated at its focal distance from the plane 31, the light will emerge from 32 as a parallel beam.

When tube 24 is bent as shown the lens 28 will move upwards relative to the original axis YX of the instrument and the virtual image 30 will move up by the same amount as the lens 28. The lens 28, being further from the fixed support of the tube than lens 29, will move further from the axis YX than does 29. Therefore, the virtual image 30 will move further from the axis YX than the lens 29. Thus a ray from the centre of the virtual image 30 to the optical centre of lens 29 will slope downwards towards the axis. By suitable choice of the focal lengths and positions of the lenses 28 and 29, the said ray may be caused to reach the original axis at the focal plane 31. The image at 31 will then have no resultant movement due to the bending. As the remaining optical parts of the telescope are in the fixed portion, there will be no movement of the image as viewed by the eyepiece.

We claim:

1. An optical viewing instrument comprising an elongated casing having entrance and viewing ends, supporting means rigidly supporting said casing intermediate said ends, said casing having a bendable portion between said supporting means and said entrance end which is free and subject to bending, a telescope system having a plurality of optical elements supported within said casing in axially spaced relation producing an image at a selected focal plane including an optical element at said entrance end for directing light rays toward said selected focal plane, said optical elements including at least one adjustable optical element supported for tilting movement relative to the casing, a substantially rigid elongated control member intercoupled with said adjustable optical element for regulating the angular position of said adjustable optical element, said control member normally disposing said adjustable optical element at a position to transmit emergent rays along a normal axis to produce an image at said focal plane at a selected normal image position when said bendable casing portion occupies a normal unbent position, said control member lying at least partially within said bendable casing portion, and a plurality of axially spaced mounting means supporting said control member on said casing including mounting means extending between said control member and said bendable casing portion to effect tilting of said control member in response to bending movement of said bendable casing portion for selectively tilting said adjustable optical element relative to the casing upon bending of said bendable casing portion to continuously dispose said adjustable optical element at positions substantially stabalizing the image produced at said focal plane against displacement from said normal image position.

2. An optical viewing instrument comprising an elongated casing having entrance and viewing ends, supporting means rigidly supporting said casing at a point intermediate said ends, said casing having a bendable portion between said supporting means and said entrance end which is free and subject to bending, a plurality of optical elements supported within said casing in axially spaced relation forming a telescope system including an ocular lens system having a selected focal plane, a fixed optical element mounted in said bendable casing portion for directing light rays toward said focal plane and an adjustable optical element, a substantially rigid carrier member for supporting said adjustable optical element within said casing at a position in the path of light directed from said fixed optical element to transmit emergent rays along a normal axis to produce an image at a normal image position in said focal plane when said bendable casing portion occupies a normal unbent position, said carrier member lying at least partially within said bendable casing portion, and mounting means supporting said carrier member in said casing at a plurality of axially spaced positions along the casing including mounting means extending between said carrier member and said bendable casing portion for shifting said adjustable optical element relative to the casing and relative to said fixed optical element responsive to bending of said bendable casing portion to selectively incline the axis of the emergent rays relative to said normal axis to stabilize the image produced at said focal plane against displacement from said normal image position.

3. An optical viewing instrument comprising an elongated casing having entrance and viewing ends, supporting means rigidly supporting said casing at a point intermediate said ends, said casing having a bendable portion between said supporting means and said entrance end which is free and subject to bending, a plurality of optical elements supported within said casing in axially spaced relation forming a telescope system including an ocular lens system having a selected focal plane, a fixed optical element mounted in said bendable casing portion for directing light rays toward said focal plane and an adjustable optical element, a substantially rigid carrier member for supporting said adjustable optical element within said casing at a position in the path of light directed from said fixed optical element to transmit emergent rays along a normal axis to produce an image at a normal image position in said focal plane when said bendable casing portion occupies a normal unbent position, said carrier member lying at least partially within said bendable casing portion, and mounting members extending between said carrier member and said casing for supporting said carrier member on said casing located at a plurality of axially spaced positions along the casing including at least one position in said bendable casing portion for tilting said adjustable optical element and shifting the same transversely of said normal axis and relative to said casing and said fixed optical element upon bending of said bendable casing portion and thereby inclining the axis of the emergent rays relative to said normal axis to continuously substantially maintain the image produced at said focal plane against movement from said normal image position.

4. An optical viewing instrument comprising an elongated casing having entrance and viewing ends, supporting means rigidly supporting said casing at a point intermediate said ends, said casing having a bendable portion between said supporting means and said entrance end which is free and subject to bending and a rigid portion adjacent said supporting means, a plurality of optical elements supported within said casing in axially spaced relation forming a telescope system including an ocular lens system having a selected focal plane, a fixed optical element mounted in said bendable casing portion for directing light rays toward said focal plane and a lens positioned intermediate said fixed optical element and said focal plane, a substantially rigid carrier member for supporting said lens within said casing to receive light directed from said fixed optical element and transmit emergent rays along a normal axis to produce an image at a normal image position in said focal plane when said benable casing portion occupies a normal unbent position, said carrier member lying at least partially within said bendable casing portion, a plurality of mounting members including mounting members extending between said carrier member and said bendable casing portion for supporting said carrier member on said casing and located at a plurality of axially spaced positions along the casing for shifting said lens transversely of said normal axis and relative to said casing and said fixed optical element upon bending of said bendable casing portion and thereby inclining the axis of said emergent rays relative to said normal axis to continuously substantially maintain the image produced at said focal plane against movement from said normal image position.

5. In an optical viewing instrument, the combination recited in claim 4 wherein said mounting members are located in two transverse planes interspaced axially of said casing and said lens is spaced axially from said two transverse planes, said carrier member extending into both said bendable portion and said rigid portion of said casing, one of said two transverse planes being located in the bendable portion of the casing and the other of said two transverse planes and said lens being located one in one of said casing portions and the other in the other of said casing portions.

6. A periscope comprising an elongated casing having entrance and viewing ends, supporting means rigidly supporting said casing at a point intermediate said ends, said casing having a longitudinally extending bendable portion between said supporting means and said entrance end and a longitudinally extending rigid portion adjacent said supporting means, a telescope system comprising an eyepiece mounted in said viewing end having a selected focal plane, a light transmitting window mounted at said entrance end in said bendable portion, a light-reflecting optical element adjacent said window and directing light entering said window toward said focal plane, and a lens intermediate said light-reflecting optical element and said focal plane, a substantially rigid elongated carrier member for supporting said lens in the path of light directed from said light-reflecting optical element to transmit emergent rays along a normal axis to produce an image at a normal image position in said focal plane when said bendable casing portion occupies a normal unbent position, said carrier member extending into both of said bendable and rigid casing portions, mounting means extending between said carrier member and said casing for supporting said carrier member on said casing, said light-reflecting optical element supported in said bendable casing portion being moved upon bending of said casing and altering the direction of light directed thereby toward said focal plane, and said mounting means including mounting members located in two transverse planes interspaced axially of the casing including at least one transverse plane located in said bendable portion for tilting said carrier member and said lens and shifting said lens tranversely of said normal axis and relative to said casing and said fixed optical element upon bending of said bendable casing portion to incline the axis of the emergent rays from said lens relative to said normal axis to compensate movement of said light-reflecting optical element and continuously substantially maintain the image produced at said focal plane against movement from said normal image position.

References Cited in the file of this patent

UNITED STATES PATENTS

| | | |
|---|---|---|
| 2,488,239 | Rattray | Nov. 15, 1949 |
| 2,523,577 | Laverdure | Sept. 26, 1950 |